US012679980B2

(12) United States Patent
Muns et al.

(10) Patent No.: US 12,679,980 B2
(45) Date of Patent: Jul. 14, 2026

(54) MULTILAYER COATING WITH DIGITAL PRINTING

(71) Applicant: SWIMC LLC, Cleveland, OH (US)

(72) Inventors: Jade Yoon Joo Muns, Minneapolis, MN (US); Ted R. Best, Lakeville, MN (US)

(73) Assignee: SWIM LLC, Cleveland, OH (US)

( * ) Notice: Subject to any disclaimer, the term of this patent is extended or adjusted under 35 U.S.C. 154(b) by 0 days.

(21) Appl. No.: 18/044,925

(22) PCT Filed: Oct. 1, 2021

(86) PCT No.: PCT/US2021/053102

§ 371 (c)(1),
(2) Date: Mar. 10, 2023

(87) PCT Pub. No.: WO2022/072784

PCT Pub. Date: Apr. 7, 2022

(65) Prior Publication Data

US 2024/0018363 A1      Jan. 18, 2024

Related U.S. Application Data

(60) Provisional application No. 63/086,895, filed on Oct. 2, 2020.

(51) Int. Cl.
C09D 4/00 (2006.01)
C09D 1/00 (2006.01)
(Continued)

(52) U.S. Cl.
CPC ................. C09D 4/00 (2013.01); C09D 1/00 (2013.01); C09D 123/06 (2013.01); C09D 167/00 (2013.01)

(58) Field of Classification Search
CPC .......... C09D 4/00; C09D 1/00; C09D 123/06; C09D 167/00
(Continued)

(56) References Cited

U.S. PATENT DOCUMENTS 5,246,557 A      9/1993  Hughes et al.
6,004,629 A  *  12/1999  Madigan ................. B08B 3/022
                                                            427/601
(Continued)

FOREIGN PATENT DOCUMENTS

CN          1616241        5/2005
CN          101356245      1/2009
(Continued)

OTHER PUBLICATIONS

International Search Report for international application No. PCT/US2021/053102, dated Dec. 7, 2021 (4 pages).
(Continued)

*Primary Examiner* — Betelhem Shewareged

(57) ABSTRACT

A multilayer coating system for metal substrates is described. The coating system includes a digital printed coating layer applied to the substrate and a clear coating layer applied over the digital printed coating layer. The digital printed coating layer is applied using a jet process and the inks used are inorganic inks. The described multilayer coating system demonstrates a color change ($\Delta E$) of no more than 5 units.

12 Claims, 1 Drawing Sheet

Proposed Garage Door System

(51) Int. Cl.
    *C09D 123/06*      (2006.01)
    *C09D 167/00*      (2006.01)

(58) Field of Classification Search
    USPC ........................................................ 428/204
    See application file for complete search history.

(56)           References Cited

U.S. PATENT DOCUMENTS

| | | | |
|---|---|---|---|
| 7,579,388 B2 | 8/2009 | Kiefer | |
| 2008/0226833 A1* | 9/2008 | Kiefer-Liptak | C09D 11/101 |
| | | | 427/508 |
| 2008/0268214 A1 | 10/2008 | Hayes et al. | |
| 2013/0098928 A1* | 4/2013 | Selepack | G09F 3/02 |
| | | | 220/660 |
| 2015/0345141 A1* | 12/2015 | Caselli | B32B 3/10 |
| | | | 347/110 |
| 2016/0145449 A1* | 5/2016 | Hilgers | C09D 4/00 |
| | | | 522/18 |

FOREIGN PATENT DOCUMENTS

| | | | |
|---|---|---|---|
| EP | 0439967 | 8/1991 | |
| EP | 1404527 B1 * | 3/2009 | .......... B41M 5/0011 |
| JP | H091049 | 1/1997 | |
| JP | H10296906 | 11/1998 | |
| JP | 2001300418 | 10/2001 | |
| JP | 2008272953 | 11/2008 | |
| JP | 2010000788 | 1/2010 | |
| JP | 2015193143 | 11/2015 | |
| KR | 101854596 | 5/2018 | |
| WO | 2005038526 | 4/2005 | |
| WO | 2010104626 | 9/2010 | |
| WO | 2019088201 | 5/2019 | |
| WO | 2019109025 | 6/2019 | |
| WO | 2020181064 | 9/2020 | |

OTHER PUBLICATIONS

Written Opinion for international application No. PCT/US2021/053102, dated Dec. 7, 2021 (3 pages).
Extended European search report for European patent application No. 21876564.2, dated Sep. 16, 2024 (11 pages).
Office Action issued for corresponding Chinese patent application No. 202180064220.9, dated Oct. 30, 2024 (20 pages, including English translation).
Jin Yinhe, "Packing Printing Technology," China Textile Publishing House (Dec. 2005), p. 261-262, including English translation.
Office Action issued for corresponding patent application CN202180064220.9, dated Jul. 8, 2025 (15 pages, including English translation).

* cited by examiner

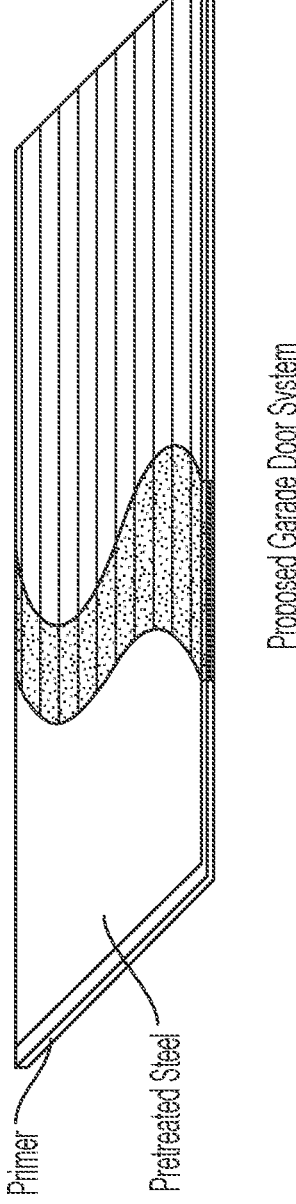
Primer
Pretreated Steel
Proposed Garage Door System

MULTILAYER COATING WITH DIGITAL PRINTING

BACKGROUND OF THE INVENTION

Polymer coating compositions are routinely applied to substrates, especially metal substrates. Such coatings are used for a variety of reasons, including, for example, to protect the substrate from degradation, to beautify the substrate (e.g., to provide color, brightness, etc.), and/or to reflect light in a particular way. Coatings often combine all these characteristics to produce articles that are both protective and decorative.

Many such polymer coatings are applied on planar substrates (e.g., using coil coating processes) that are subsequently formed into finished articles, including articles such as exterior building products or materials like garage doors, for example. In general, for a coating composition to be used as an exterior coil coating, the composition must demonstrate long-term outdoor weathering, durability, and improved wear or mar resistance.

Coil coatings are also used to impart decorative properties. For such applications, The coating must also maintain a suitable aesthetic appearance (gloss, color, and the like) over prolonged periods of exposure to various conditions, including light, humidity, rain, fluctuating temperatures, and the like.

Conventionally, it has been difficult to integrate decorative aspects of coatings (patterns, textures) and the like into a coil coating process or line. Although embossing on the line and the use of particular resins can provide patterned coatings, it has been difficult to incorporate customized printing of layers into a coil coating process, and the variety of patterns seen with digital printing has not been seen with conventional coil coating methods. Additionally, the pigments and inks used in conventional digital printing are not always compatible with the thermal cure process typically used in coil applications, and therefore, the coil process must be modified in order to incorporate patterns, colors, textures, and the like.

From the foregoing, it will be appreciated that what is needed in the art is a multilayer coating system that integrates the ease of application and durability of a coil coating system with the aesthetic value of a digital printed ink layer. Such multilayer coatings, coated articles, and methods for preparing the same are disclosed and claimed herein.

SUMMARY

The present description provides a multi-layer coating system. The coating system described herein is applied by a coil coating process, and is intended primarily for outdoor use.

In one embodiment, the multilayer coating system described herein includes a digital printed layer and a clearcoat layer applied over the digital printed layer. The digital printed layer uses inorganic ink, and the clearcoat layer is radiation-curable. The multilayer coating system demonstrates a color change ($\Delta E$) of no more than about 5 units on prolonged exposure to uv radiation.

In another embodiment, the multilayer coating system described herein is used to produce coil-coated articles that have colors and/or patterns digitally printed on a substrate surface. In an aspect, the substrate is a metal sheet or panel with specific colors and/or patterns printed thereon.

In yet another embodiment, the present description provides a method for making a multilayer coating system as described herein. The method includes the steps of providing a substrate and applying a primer and a basecoat to the substrate. This step is followed by the application of an ink layer in the form of a digitally printed layer. A radiation-curable clearcoat is then applied over the digitally printed layer. In an aspect, the method is part of a coil coating application process.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the accompanying drawings and the description below. Other features, objects, and advantages of the invention will be apparent from the description and drawings, and from the claims.

BRIEF DESCRIPTION OF THE DRAWINGS

FIG. 1 illustrates an exemplary embodiment of the multilayer coating system described herein.

SELECTED DEFINITIONS

Unless otherwise specified, the following terms as used herein have the meanings as provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on.

When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "component" refers to any compound that includes a particular feature or structure. Examples of components include compounds, monomers, oligomers, polymers, and organic groups contained there.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

Unless otherwise indicated, a reference to a "(meth) acrylate" compound (where "meth" is bracketed) is meant to include both acrylate and methacrylate compounds.

The term "polycarboxylic acid" includes both polycarboxylic acids and anhydrides thereof.

The term "ink" as used herein refers to a colored component used to digitally print a layer in the multi-layer coating system described herein. The inks described herein may be dispersions or suspensions of solid pigment particles, solutions or suspensions of dyes, and the like. Inks may be organic, inorganic, or hybrid systems.

A "patterned" coating refers to a hardened or cured coating printed, preferably digitally printed, in two or more regions on a substrate surface, which may or may not have "blank" regions between and/or surrounding the printed (i.e., coated) regions, wherein "blank" regions have no coating thereon. A "patterned" coating, as used herein, refers to an ink layer that has been digitally printed or deposited on to a substrate, and is distinct from an all-over solid or colored coating. The printed patterned layer has regions where ink has been deposited and regions where no ink has been deposited, thereby producing a distinct pattern. The patterned coating may include a regular or irregular pattern of coated regions, which may be in a variety of shapes (e.g., stripes, diamonds, squares, circles, ovals). The terms "pattern" and "patterned" do not require any repetition in design elements, although such repetition may be present. The coated regions of the patterned coating are preferably "continuous," i.e. they are free of pinholes and other coating defects that result in exposed substrate if an underlying coating is not present.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides a multi-layer coating system. The coating system described herein includes a digitally printed ink layer and a clearcoat applied over the ink layer by a coil coating process. The described multi-layer coating system is intended primarily for outdoor use, and demonstrates optimal weatherability on prolonged exposure to various conditions, including light (uv radiation), humidity, rain, fluctuating temperatures.

In an embodiment, the present description provides a multi-layer coating system that includes a digital printed layer applied on a substrate. The substrate is preferably metal, but may be any planar material that can be used in a coil coating or application process. and a clear coating layer applied over the digital printed layer. The coating system demonstrates a color change ($\Delta E$) of no more than 5 units on prolonged exposure to ultraviolet (uv) radiation. In an aspect, 500 to 2000 hours of exposure to accelerated weather testing using methods known to those of skill in the art, such as QUV-A testing, Xenon arc testing, and the like, for example, are used as a substitute for exposure to harsh weather conditions including prolonged exposure to the sun and uv radiation.

In a preferred aspect, the substrate is a planar metal surface to which a primer and basecoat have been applied. Any primer or basecoat coating composition that is conventionally used in the coil coating process may be used for the substrate described herein. In an aspect, the primer and/or basecoat each independently include a binder resin component. In one embodiment, the binder system includes a resin component. The resin component is selected from various film-forming binder resins, including, for example, polyesters, modified polyesters, polyurethanes, polyacrylates, epoxies, polyethers, modified polyacrylates, amides, amines, isocyanates, and mixtures or combinations thereof In an aspect, the binder system includes about 1 to 50 wt %, preferably 5 to 25 wt %, more preferably 10 to 20 wt % of the resin component, based on the total weight of the composition.

In a preferred aspect, the resin component for the primer and/or basecoat includes one or more polyester resins. Suitable polyesters include, for example, resins formed by reaction of compounds having reactive functional groups such as, for example, compounds with hydroxyl, carboxyl, anhydride, acyl, or ester functional groups. Hydroxyl functional groups are known to react, under proper conditions, with acid, anhydride, acyl or ester functional groups to form a polyester linkage. Suitable compounds for use in forming the polyester resin include mono-, di-, and multi-functional compounds. Di-functional compounds are presently preferred. Suitable compounds include compounds having reactive functional groups of a single type (e.g., mono-, di-, or poly-functional alcohols or mono-, di-, or poly-functional acids) as well as compounds having two or more different types of functional groups (e.g., a compound having both an anhydride and an acid group, or a compound having both an alcohol and an acid group, etc).

In an embodiment, the coating composition further includes a crosslinker or crosslinking agent. The crosslinker may be used to facilitate cure of the coating and to build desired physical properties. When present, the amount of crosslinker will vary depending upon a variety of factors, including, e.g., the intended end use and the type of crosslinker. Typically, one or more crosslinkers will be present in the coating composition in an amount greater than about 0.01 wt %, more preferably from about 1 wt % to about 20 wt %, even more preferably from about 2 wt % to about 10 wt %, and most from about 3 wt % to about 7 wt %, based on total weight of the composition.

Polyesters having hydroxyl groups are curable through the hydroxyl groups. Suitable hydroxyl-reactive crosslinking agents may include, for example, aminoplasts, which are typically oligomers that are the reaction products of aldehydes, particularly formaldehyde; amino- or amido-group-carrying substances exemplified by melamine, urea, dicyandiamide, benzoguanamine and glycoluril; blocked isocyanates, or a combination thereof.

Suitable crosslinkers include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used. Suitable commercial amino crosslinking agents include those sold by Cytek under the tradename CYMEL (e.g., Cymel 301, Cymel 303, and Cymel 385 alkylated melamine-formaldehyde resins, or mixtures of such resins, are useful) or by Solutia under the tradename RESIMENE.

Suitable crosslinkers may also include blocked isocyanates, such as, for example, as described in U.S. Pat. No. 5,246,557. Blocked isocyanates are isocyanates in which the isocyanate groups have reacted with a protecting or blocking agent to form a derivative that will dissociate on heating to remove the protecting or blocking agent and release the reactive isocyanate group. Some examples of suitable blocking agents for polyisocyanates include aliphatic, cycloaliphatic or aralkyl monohydric alcohols, hydroxylamines and ketoximes. Presently preferred blocked polyisocyanates dissociate at temperatures of around 160° C. The presence of a catalyst is preferred to increase the rate of reaction between the liberated polyisocyanate and the active hydrogen-containing compound (e.g., a hydroxyl-functional polyester). The catalyst can be any suitable catalyst such as, for example, dibutyl tin dilaurate or triethylene diamine.

Suitable crosslinkers also include unblocked isocyanates. Unblocked isocyanates are difunctional or polyfunctional isocyanates with free isocyanate groups attached to aliphatic, cycloaliphatic, aryl, araliphatic and/or aromatic moieties. Examples include, without limitation, tetramethylene diisocyanate, hexamethylene diisocyanate, dodecamethylene diisocyanate, 1,4-diisocyanatocyclohexane, 3,5,5-trimethylcyclohexyl isocyanate, isophorone diisocyanate, and the like.

In some embodiments, an ultraviolet curing crosslinker or an electron-beam curing crosslinker may be suitable. Examples of suitable such crosslinkers may include 1,6-hexanediol diacrylate, 1,4-butanediol diacrylate, trimethylolpropane triacrylate, or mixtures thereof.

The primer or basecoat composition described herein may be produced by conventional methods known to those of skill in the art. In an embodiment, the coating composition is prepared by use of a polymerization or curing aid, such as a catalyst, for example. Suitable processing aids include, without limitation, metal catalysts (e.g., stannous oxalate, stannous chloride, butylstannoic acid, dibutyl tin dilaurate, dibutyl tin oxide, tetrabutyltitanate, or tetra butylzirconate), antioxidants (e.g., hydroquinone, monotertiarybutyl-hydroquinone, benzoquinone, 1,4-napthoquinone,2,5-diphenyl-p-benzoquinone, or p-tert butylpyrocatechol), unblocked and blocked acid catalysts (e.g., dinonylnaphthalene sulfonic acid, dinonylnaphthalene disulfonic acid, dodecyl benzene sulfonic acid, p-toluene sulfonic acid, phosphate esters, and mixtures or combinations thereof), amine-type catalysts (e.g., 1,4-diazobicyclo[2.2.2]octane, and variations or derivatives thereof), and mixtures or combinations thereof. The amount of catalyst depends on the amount and nature of the reactants, but is no more than about 5 wt %, preferably no more than about 2 wt %, more preferably about 0.05 to 0.1 wt %, based on the total weight of the composition. In a preferred aspect, the catalyst is an amine-type catalyst and is present in an amount of no more than about 5 wt %.

The binder system of the primer or basecoat composition described herein is preferably made by blending the resin component with a crosslinker. In an embodiment, the blending process is carried out in a liquid carrier, preferably a solvent or mixture of solvents, preferably a solvent or blend of solvents having a kauri butanol number (Kb) of about 50 or more. Suitable solvents include, for example, aromatic hydrocarbon solvents (AROMATIC 150, and the like); ketones (e.g., acetone, methyl ethyl ketone, cyclohexanone, and the like) esters (e.g., dialkyl esters (such as dimethyl ester, diisobutyl ester, propylene glycol monomethyl ether acetate (PM acetate), long chain acetates, and the like), alcohols, chlorinated hydrocarbons, ester-ethers (e.g., glycol ether-esters, ethyl-3-ethoxypropionate, commercially available as EEP from Eastman, and the like), and combinations or mixtures thereof In a preferred aspect, the solvent is an aromatic hydrocarbon or a solvent blend of at least one aromatic hydrocarbon and at least one ester, and is present in an amount of up to about 70 wt %, preferably about 5 wt % to 50 wt %, more preferably 10 wt % to about 30 wt %, based on the total weight of the composition.

In an embodiment, the multi-layer coating system described herein includes a digital printed layer applied over a basecoat. In an aspect, the digital printed layer includes ink to impart color or pattern to the digital printed layer. The ink compositions used in the multi-layer coating system described herein are radiation-curable ink compositions for ink jet printing. Radiation curable inks are hardened or set by actinic radiation, such as ultraviolet radiation, for example. Inks of this type are jettable, i.e. suitable for application by ink jet printing and are commercially available, including from Electronics For Imaging (EFI), for example.

Suitable radiation-curable ink compositions include, for example, the ink types and systems described in U.S. Pat. No. 7,579,388, the disclosure of which is fully incorporated herein by reference. The ink systems used in the digital printed layer described herein are zero VOC systems that do not include a solvent or non-reactive diluent. In a preferred aspect, the ink system used herein is a 100% solids system.

If color is desired, or if the digital ink layer is intended to be jetted or printed in a particular pattern, the ink compositions also include a pigment component. Pigments that resist fading are preferred. The pigment component is present in the ink composition in an amount in the range of 0%, for producing a clear coating, to about 10% by weight where color or pattern are desired. Both organic and inorganic pigments can be incorporated in the digital ink layer as described herein.

Suitable organic pigments include, without limitation, phthalocyanines, anthraquinones, perylenes, carbazoles, monoazo- and di sazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines, and others known in the art.

Suitable examples of inorganic pigments include, without limitation, various metal oxides and metal salts such as titanium oxide ($TiO_2$), red iron oxide, yellow iron oxide, bismuth vanadate, cobalt blue, iron cobalt chromite black, carbon black, zirconium-praesodymium silicate yellow, and the like, or mixtures or combinations thereof.

In a preferred embodiment, the multi-layer coating system described herein includes a digital printer layer applied over a basecoat, wherein the digital printed layer includes inorganic ink. In an aspect, a particular ink is chosen to impart a desired color or pattern, and also for compatibility of the ink layer with the basecoat layer applied to the substrate. Without limiting to theory, a digital printed ink layer is compatible with a basecoat when the intercoat adhesion between the ink layer and the basecoat is optimal, i.e. where a test coating of the ink layer and basecoat has crosshatch adhesion of at least 4B when tested by ASTM D 3359 Test Method B.

In a preferred embodiment, the multi-layer coating system described herein includes a digital printed layer applied over a basecoat layer. The basecoat layer is a conventional polyester coating applied by coil application methods known to those of skill in the art. The basecoat layer is applied at a dry film thickness (DFT) of 0.1 to 1.0 mil (2.5 to 25.4 µm), preferably 0.2 to 0.8 mil (5.1 to 20.3 µm), more preferably 0.6 to 0.7 mil (15.24 to 17.8 µm).

As described herein, the multi-layer coating system includes a clearcoat layer applied over the digital printed ink layer. In an aspect, the clearcoat is applied at a dry film thickness (DFT) of about 0.1 to 1.0 mil (2.5 to 25.4 µm), preferably 0.2 to 0.7 mil (5.1 to 17.8 µm), more preferably 0.3 mil to 0.5 mil (7.6 to 12.7 µm).

In an embodiment, the clear coat layer is derived from a coating composition that includes a resin component. In an aspect, the resin component is selected from polyether, polyester, modified polyester, polyepoxy systems, acrylates, or mixtures or combinations thereof. In a preferred embodiment, the resin component is radiation-curable. The term "radiation-curable," as used herein, refers to a resin component where crosslinking reactions that result in the hardening or cure occur via cationic or free radical mechanisms. The cure reaction is initiated by the use of either ultraviolet/ actinic radiation (UV cure) or by the use of electron beam methods (EB cure). These methods are standard methods for radiation cure of coating compositions and are known to those of skill in the art. In a preferred aspect, the clearcoat described herein is an EB cure system.

The clearcoat described herein is derived from a 100% solids coating composition that is also zero VOC. The coating composition may optionally contain a photoinitiator to facilitate radiation or UV curing. In a preferred aspect, the clearcoat composition described herein is an EB cure system that does not contain photoinitiators.

In alternative embodiments, the clearcoat may also be a thermally curable coating layer, i.e. a coating where the crosslinking reaction that hardens or cures the coating is initiated by the application of heat.

In a preferred embodiment, the clearcoat coating composition includes a resin component derived from low viscosity monomers or oligomers including, for example, include polyethers, polyesters, alkoxylated polyepoxy acrylates, aliphatic polyepoxy acrylates, or urethane (meth)acrylates and mixtures thereof. In a preferred aspect, the resin component is derived from urethane (meth)acrylate monomers or oligomers.

Suitable examples of urethane (meth)acrylates include, without limitation, reactive multifunctional aromatic urethane (meth)acrylates (Sartomer Corp., Exton, PA) with varying urethane content and molecular weights. Other suitable urethane (meth)acrylates include the resins available from Cytec Industries such as EBECRYL 220 (molecular weight approx. 1000), a prepolymer based upon acrylic acid, an aliphatic unsaturated polyester and an aromatic isocyanate, EBECRYL 8301 (molecular weight approx. 1000), a hexafunctional aliphatic urethane acrylate containing an acrylated polyol diluent. Mixtures or combinations of such urethane (meth)acrylate monomers or oligomers may be used in the resin component of the clearcoat composition described herein.

In the clearcoat composition described herein, the urethane (meth)acrylate resin component is present in an amount of about 10 to 50 wt %, preferably 20 to 40 wt %, based on the total weight of solids in the composition.

In an embodiment, the clearcoat layer described herein is obtained from a coating composition that further includes a reactive diluent. As used herein, the term "reactive diluent" relates to monomers and/or oligomers that are essentially non-reactive with the urethane (meth)acrylate monomers or oligomers. As such, the reactive diluent is preferably devoid of groups that may react with ingredients of the urethane (meth)acrylate. Such groups may include, for example, isocyanate groups, hydroxyl groups, thiol groups, amine groups, imine groups, etc. The reactive diluent preferably functions as a solvent or otherwise lowers the viscosity of the blend of reactants. In certain embodiments, the use of one or more reactive diluents as a "solvent" can eliminate or reduce the need to incorporate a substantial amount of other cosolvents (such as, e.g., butanol) during processing. The reactive diluent is preferably capable of undergoing a reaction to form a polymer (typically a vinyl addition polymer) after dispersing the polyurethane polymer into an aqueous carrier.

Suitable reactive diluents may include vinyl addition monomers or oligomers such as free-radical reactive monomers and oligomers, monomers or oligomers containing carbonate functionality or glycidyl functionality, or combinations thereof In some embodiments, the reactive diluent constitutes a portion, or all, of the ethylenically unsaturated component used to produce the vinyl polymer. Reactive diluents useful in the present invention include, for example, vinyl compounds, acrylate compounds, methacrylate compounds, acrylamides, acrylonitriles, and combinations thereof. Suitable vinyl compounds include, for example, vinyl toluene, vinyl acetate, vinyl chloride, vinylidene chloride, styrene, substituted styrenes, isoprene, butadiene, and combinations and oligomers thereof. Suitable (meth)acrylate compounds may include, for example, butyl acrylate, ethyl acrylate, 2-ethylhexyl acrylate, isobutyl acrylate, tert-butyl acrylate, methyl acrylate, 2-hydroxyethyl acrylate, poly(ethylene glycol) acrylate, isobornyl acrylate, butyl methacrylate, methyl methacrylate, ethyl methacrylate, isobutyl methacrylate, 2-hydroxyethyl methacrylate, poly (ethylene glycol)methacrylate, poly(propylene glycol) methacrylate, any other suitable (meth)acrylates disclosed herein, and combinations thereof. Methacrylates are presently preferred.

In a preferred embodiment, the clearcoat composition includes tri(propylene glycol) diacrylate (TPGDA) or neopentyl glycol(PO)2 diacrylate (NPGPODA), or a combination or mixture thereof as the reactive diluent. The reactive diluent is present in an amount of about 25 to 65 wt %, preferably 35 to 55 wt %, based on the total weight of solids in the clearcoat composition.

A coating composition of the present invention may also include other optional ingredients that do not adversely affect the coating composition or a cured coating composition resulting therefrom. Such optional ingredients include, for example, catalysts, dyes, pigments, toners, extenders, fillers, lubricants, anticorrosion agents, flow control agents, thixotropic agents, dispersing agents, antioxidants, adhesion promoters, matting agents, light stabilizers (HALS), surfactants, and mixtures thereof. Each optional ingredient is included in a sufficient amount to serve its intended purpose, but not in such an amount to adversely affect a coating composition or a cured coating composition resulting therefrom.

The clearcoat layer of the multilayer composition described herein is a low gloss coating. In an embodiment, the clearcoat layer has 60-degree gloss of no more than about 50, preferably no more than about 40.

The clearcoat layer of the multilayer composition described herein is mar-resistant. The term means that a coating, particularly a surface or topcoat such as the clearcoat layer described herein, is resistant to mar, i.e. physical defects (scratches, marks, pits, and the like) that usually occur within a few micrometers of the surface of the clearcoat and damage the physical appearance of the coating system.

In an embodiment, the multilayer coating system described herein is applied to a substrate to form a coated article. A wide variety of substrates may be used with the coating system described herein, including metal, wood, polymeric substrates, and the like. The multilayer coating system described herein may find utility in a variety of other end uses, including industrial uses such as, for example, appliance coatings, packaging coatings, sheet metal building stock (such as gutters, for example), interior or exterior steel building products, HVAC applications, agricultural metal products, wood coatings, etc. In a preferred aspect, the cured coating described herein is used an exterior steel product.

Non-limiting examples of metal substrates that may benefit from having a coating composition of the invention applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel).

The primer, basecoat and clear coat compositions described herein are typically applied using a coil coating process, wherein each composition is wiped onto the sheet as it unwinds from a coil and then baked as the sheet travels toward an uptake coil winder. In an embodiment of the methods described herein, the digital printing process for creating the ink layer is integrated into the coil coating application process. The primer and/or basecoat compositions are cured or hardened in a heated temperature environment of from about 200 to 500° C., more preferably from about 270 to 470° C. For coil coating operations, the coating is typically baked for 8 to 25 seconds, to a peak metal temperature (PMT) of from about 200 to 250° C. After the digital printed ink layer is applied and cured, the clearcoat composition layer is hardened or cured by an electron beam process.

An exemplary coated article having the multi-layer coating system as described herein is shown in FIG. 1. The planar metal substrate shown in FIG. 1 is a garage door made of pretreated steel. The first layer of the multi-layer coating system is a primer applied to the substrate surface. The next layer is a polyester basecoat applied over the primer. An ink layer in a specific color or pattern (such as a wood grain, for example) is the next layer, and is digitally printed on to the basecoat layer. An EB-cured clearcoat is the final layer and is applied over the digital printed ink layer.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Missouri.

Test Methods

Unless indicated otherwise, the following test methods were utilized in the Examples that follow.

A. Adhesion Test (Blistering and Cross-Hatch Testing)

Blistering and cross-hatch testing are performed to assess adhesion of the coating, specifically intercoat adhesion between the digital printed ink layer and the clearcoat layer of the multilayer coating system described herein. The cross-hatch test was performed according to ASTM D 3359 Test Method B, wherein adhesion is rated on a scale of 0B to 5B where a rating of "5B" indicates no adhesion failure, i.e. no loss of coating from a crosshatch, a rating of "2B"

indicates 15 to 35% paint loss from the crosshatch, and a rating of "0B" indicates greater than 65% paint loss from the crosshatch. Adhesion ratings of 5B and no less than 4B are typically desired for commercially viable coatings.

Blister ratings were determined according to DIN EN ISO 4628-2 (2016) This test is used to determine the quantity and size of defects or blisters and the intensity of changes in appearance of coatings, in particular, for defects caused by ageing and weathering. The test specifies a method for assessing the degree of blistering of coatings by comparison with pictorial standards, where blisters are rated according to their size and the quantity of blisters of a particular size. A rating of "0S0" indicates no blistering, while a rating of "5S5" indicates blistering all over the surface

B. Accelerated Weathering Testing

Accelerated weathering testing is performed using either the QUV-A method or by Xenon arc testing. In the QUV-A method, test panels were exposed to alternating cycles of UV light and moisture at controlled, elevated temperatures for various periods of time, from 250 hours up to about 2000 hours. The test simulates the effects of sunlight using special fluorescent UV lamps. The QUV-A testing process simulates the effect of dew and rain over a prolonged time period with condensing humidity and/or water spray. In Xenon arc testing, test panels were exposed to filtered xenon arc light under controlled environmental conditions for various periods of time, from 250 hours up to about 1500 hours, according to the procedure specified in ASTM G155.

For both tests, the color (CIE L, a, b-30 values) for each panel is measured over a period of time equivalent to the total hours of exposure, and weatherability is assessed according to the color change ($\Delta E$) value obtained for each test panel. Weatherability may also be assessed by observing gloss retention after accelerated weather testing using ASTM D523 (Standard Test Method for Specular Gloss). Panels are prepared according to standard methods known in the art and gloss ratings are taken at a 60° angle using a handheld gloss meter (Byk Gardner USA, Maryland). These gloss ratings are compared to the ratings from a black glass standard at the same angle. A durable and weatherable coating will demonstrate minimal change in gloss over a short period of exposure to natural sunlight, and is reported as percentage of gloss retained after exposure.

C. Surface Tension

Surface tension is used to calculate various interfacial qualities of the digital printed ink layer of the multilayer coating system described herein. To determine surface tension, the Wilhelmy plate method is used. In this method, a thin plate, preferably a metal plate, is used to measure equilibrium surface or interfacial tension at an air—liquid or liquid—liquid interface. In this method, the plate is oriented perpendicular to the interface, and the force exerted on it is measured. This force is equivalent to the surface tension at the interface and can be used to calculate a number of interfacial qualities or parameters, including adhesion energy, interfacial tension, ratio of interfacial tension, and spreading coefficient.

Example 1. Color Change and Gloss Retention

In order to determine the weatherability of the multilayer coating systems, a multilayer coating system was applied to a series of metal test panels. For each panel, a polyethylene (PE) basecoat was applied with a particular ink layer applied thereon followed by an EB-cured clearcoat. Each test panel used a different pigment for the ink layer, as shown in Table 1 below. Each test panel was subjected to accelerated weather testing by QUV-A for 1000 and 2000 hours. Weatherability was determined and reported as color change ($\Delta E$) and as percent gloss retention for each panel for 2000 hours of exposure, as shown in Table 1.

TABLE 1

| Color Change and Gloss Retention | | | | |
| --- | --- | --- | --- | --- |
| Code | Pigment | Type | $\Delta E$ (2000 h) | % Gloss Retention |
| PB28 | Cobalt blue | Inorganic | 5.27 | 40.13 |
| PR101 | Red iron oxide | Inorganic | 6.49 | 30.25 |
| PR254 | Pyrrole red (DPP) | Organic | 3.00 | 38.53 |
| PY150 | Ni-Azo metal | Organic | 3.41 | 36.13 |
| PY110 | Isoindolinone | Organic | 1.61 | 32.49 |
| PY159 | Zirconium-Praesodymium silicate yellow | Inorganic | 4.97 | 32.63 |
| PY184 | Bismuth vanadate | Inorganic | 2.66 | 25.85 |
| PBk27 | Iron Cobalt chromite black | Inorganic | 2.28 | 33.71 |
| PBk7 | Lamp black | Organic | 2.84 | 40.03 |

EXAMPLE 2. ADHESION TESTING

To determine the intercoat adhesion between the ink layer and the EB clearcoat layer, test panels were prepared as described in Example 1. Test panels were then exposed for 500 h and tested for cross-hatch adhesion and blistering. Results for cross-hatch adhesion testing are shown in Table 2, where 5B represents no removal of coating and 0B represents more than 65% removal of coating.

TABLE 2

| Crosshatch Adhesion Results | | | |
| --- | --- | --- | --- |
| Code | Pigment | Type | |
| PB28 | Cobalt blue | Inorganic | 5B |
| PR101 | Red iron oxide | Inorganic | 3B |
| PR254 | Pyrrole red (DPP) | Organic | 3B |
| PY150 | Ni-Azo metal | Organic | 4B |
| PY110 | Isoindolinone | Organic | 3B |
| PY159 | Zirconium-Praesodymium silicate yellow | Inorganic | 5B |
| PY184 | Bismuth vanadate | Inorganic | 4B |
| PBk27 | Iron Cobalt chromite black | Inorganic | 5B |
| PBk7 | Lamp black | Organic | 3B |

EXAMPLE 3. SURFACE TENSION AND INTERFACIAL CHARACTERISTICS

To calculate various interfacial characteristics for the multilayer coating system described herein, the surface tension was measured. Test panels were prepared as described in Example 1, and surface tension and energy were measured for each panel. Results are shown in Table 3, along with various interfacial characteristics calculated for each test panel based on surface tension and surface energy in Table 3.

TABLE 3

| | | | | | Ratio (water/ink) | |
| Code | Type | Surface Tension | Adhesion Energy | Interfacial Tension | Interfacial Tension | Spreading Coefficient |
| --- | --- | --- | --- | --- | --- | --- |
| PB28 | Inorganic | 25.4 | 63.6 | 1.9 | 25.5 | 12.9 |
| PR101 | Inorganic | 23.7 | 60.3 | 3.5 | 13.9 | 13.0 |
| PR254 | Organic | 23.3 | 58.9 | 4.6 | 10.6 | 12.3 |
| PY110 | Organic | 23.2 | 59.9 | 3.5 | 13.9 | 13.5 |
| PY159 | Inorganic | 25.4 | 63.6 | 2.0 | 24.0 | 12.7 |
| PY184 | Inorganic | 23.6 | 59.8 | 3.9 | 12.4 | 12.7 |
| PBk27 | Inorganic | 23.4 | 59.3 | 4.2 | 11.6 | 12.6 |

Surface Tension and Interfacial Characteristics

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A multi-layer weatherable coating system comprising:
   a basecoat layer comprising at least one polyester resin component applied on a planar metal surface that forms at least part of a garage door;
   a patterned coating comprising an ink composition deposited over the basecoat layer on the planar metal surface, wherein the ink composition comprises a 100% solids inorganic ink system; and
   an electron beam-cured clear coating layer comprising 20 to 40% by weight of a urethane (meth) acrylate resin component applied over the patterned coating, wherein the electron beam-cured layer is applied in a coil coating process, the patterned coating is applied by a process integrated into the coil coating application process, and wherein the coating system demonstrates a color change ($\Delta E$) of no more than 5 units on exposure to UV radiation of at least 500 hours.

2. The coating system of claim 1, wherein the ink composition includes a resin component.

3. The coating system of claim 1, wherein the ink composition includes a resin component comprising radiation-curable ethylenically unsaturated monomers or oligomers.

4. The coating system of claim 1, wherein the clear coating layer includes a resin component selected from fluoropolymer, polyester, silicon modified- polyester, or mixtures or combinations thereof.

5. The coating system of claim 1, wherein the clear coating layer includes a resin component and a reactive diluent.

6. The coating system of claim 1, wherein the clear coating layer has dry film thickness (DFT) of about 0.3 mil to 0.5 mil.

7. The coating system of claim 1, wherein the basecoat layer comprises at least one resin component.

8. The coating system of claim 1, wherein basecoat layer comprises at least one polyester resin component.

9. The coating system of claim 1, wherein the basecoat layer has a dry film thickness of about 0.6 mil to 0.7 mil.

10. The coating system of claim 1, wherein the clear coating layer has low viscosity.

11. The coating system of claim 1, wherein the clear coating layer is mar resistant.

12. The coating system of claim 1, wherein the clear coating layer demonstrates optimal adhesion to the patterned coating.

* * * * *